United States Patent [19]

Rosenkranz et al.

[11] 4,014,771

[45] Mar. 29, 1977

[54] HIGHLY REACTIVE RESIN COMPOSITIONS HARDENABLE BY UV-LIGHT

[75] Inventors: Hans Jürgen Rosenkranz, Krefeld; Hans Rudolph, Krefeld-Bockum; Artur Haus, Overath, all of Germany

[73] Assignee: Bayer Aktiengesellschaft, Germany

[22] Filed: Feb. 17, 1976

[21] Appl. No.: 658,405

Related U.S. Application Data

[63] Continuation of Ser. No. 510,466, Sept. 30, 1974, abandoned.

[30] Foreign Application Priority Data

Oct. 4, 1973  Germany .......................... 2349979

[52] U.S. Cl. .................... 204/159.23; 204/159.15; 260/836; 260/837 R; 427/54
[51] Int. Cl.² ...................... C08F 2/48; C08F 4/32
[58] Field of Search ................. 204/159.15, 159.23; 427/54; 260/836, 837 R

[56] References Cited

UNITED STATES PATENTS

| | | |
|---|---|---|
| 3,450,613 | 6/1969 | Stejnberg ..................... 204/159.15 |
| 3,551,246 | 12/1970 | Bass Emir et al. ........... 204/159.15 |
| 3,607,693 | 9/1971 | Heine et al. .................. 204/159.15 |
| 3,637,618 | 1/1972 | May ..................................... 260/836 |
| 3,840,448 | 10/1974 | Osborn et al. ................ 204/159.14 |
| 3,847,770 | 11/1974 | Radlowe et al. ............. 204/159.23 |
| 3,968,016 | 7/1976 | Wismer ........................ 204/159.16 |

*Primary Examiner*—Murray Tillman
*Assistant Examiner*—Thurman K. Page
*Attorney, Agent, or Firm*—Connolly and Hutz

[57] ABSTRACT

A mixture which is hardenable by UV-light in an extremely short time comprising
 A. 30 – 95 % by weight of a reaction product of a polyepoxide and acrylic or methacrylic acid;
 B. 5 – 70 % by weight of a tri- to hexa-acrylic or methacrylic acid ester of a tri- to hexahydric alcohol or their mixtures and
 C. 0.2 – 10 % by weight, based on the sum of (A) and (B), of a conventional photoinitiator.

The mixture is preferred used as binder for printing inks.

3 Claims, No Drawings

HIGHLY REACTIVE RESIN COMPOSITIONS HARDENABLE BY UV-LIGHT

CROSS-REFERENCE TO RELATED APPLICATION

This application is a continuation of application Ser. No. 510,466 filed Sept. 30, 1974 and now abondoned.

This invention relates to resin compositions based on polyfunctional acrylic or methacrylic acid esters which compositions are hardenable by UV-light and have a very short cure time.

It is known that glycidyl their high of bisphenol A can be reacted with acrylic acid to form resin-like products which, by virtue of their vinyl group content, are capable of being crosslinked by radial polymerization. Systems of this kind are described, for example, in British Pat. No. 1,006,587 and U.S. Pat. No. 3,317,465. Solutions of these reaction products in vinyl monomers, such as acrylic or methacrylic acid esters or even styrene, are used as casting resins which are particularly distinguished by theirhigh resistance to hydrolysis.

Products of this kind are cured by the addition of organic peroxides and, optionally, accelerators such as, for example, cobalt salts in a similar way to solutions of unsaturated polyester resins. It is also known that reaction products of epoxy resins and acrylic acid, in solution in acrylic acid esters, can be provided with a photoinitiator and cured by the action of UV-light. Products of this kind are used as special dental filling compositions, as decribed in DT-OS No. 2,126,419.

However, when attempts are made to use systems of this kind as coating compositions which harden under UV-light, as described for unsaturated polyester resins for example in DT-AS No. 1,694,149, it is found that their crosslinking rate, especially in the presence of atmospheric oxygen, is too low for pratical application. Thin layers of compositions of this kind generally retain a very tacky surface.

All the more surprising is the fact that reaction products of polyepoxides with acrylic or methacrylic acid, photoinitiators and special polyfunctional monomers, are able to form compositions which harden under UV-light and which can be cured in an extremely short time with a tack-free surface, even in the form of thin layers, in irradiation installations normally used in practice.

Accordingly, the present invention relates to mixtures which harden under UV-light of A. 30 – 95 % by weight of a reaction product of at least one polyepoxide with more than one epoxide group per molecule and acrylic or methacrylic acid or mixtures thereof, in which about 0.6 to 1 mol of carboxyl groups is used to one epoxide group, B. 5 – 70 % by weight of an acrylic or methacrylic acid ester, and C. 0.2 – 20 % by weight, based on the sum of A and B, of a conventional photoinitiator, distinguished by the fact that component (B) consists of one or more tris-, tetra-, penta- or hexa-acrylic acid or tris-, tetra-, penta- or hexamethacrylic acid esters of a trihydric, tetrahydric, pentahydric or hexahydric alcohol or a mixture thereof.

The invention also relates to the use of these mixtures as coating and impregnating compositions and as binders for printing inks which harden under UV-light.

Reaction products in which 0.8 to 1 mol of carboxyl groups have been used to one epoxide group are preferably used as component A.

Reaction products of polyepoxides with acrylic acid are also preferred.

Component A is prepared by known methods by reacting the polyepoxide with (meth)acrylic acid or mixtures thereof, at, for example, 40° to 100° C and optionally in the presence of about 0.01 to 3 % by weight, based on epoxide and acid, of a catalyst which accelerates the reaction, such as tertiary amines, alkali hydroxides or alkali salts of organic carboxylic acids (cf. U.S. Pat. Nos. 2,456,408; 2,575,440 and 2,698,308).

In the context of the invention, polyepoxides are compounds which contain more than one epoxide group (= 2,3 epoxypropyl group), preferably from 2 to 6 and more particularly from 2 to 3 epoxide groups per molecule.

The polyepoxide compounds to be used can be a polyglycidylether of a polyhydric phenols, for example of pyrocatechol, resorcinol, hydroquinone, of 4,4'-dihydroxydiphenylmethane, of 4,4'-dihydroxy-3,3'-dimethyldiphenylmethane, of 4,4'-dihydroxydiphenyl-dimethylmethane (bisphenol A), of 4,4'-dihydroxydiphenylmethylmethane, of 4,4'-dihydroxydiphenylcyclohexane, of 4,4'-dihydroxy-3,3'-dimethyldiphenylpropane, of 4,4'-dihydroxydiphenyl, of 4,4'-dihydroxydiphenylsulphone, of tris-(4-hydroxyphenyl)-methane, of the chlorination and bromination products of the aforementioned diphenols, especially of bisphenol A; of novolaks (i.e., of reaction products of monohydric or polyhydric phenols with aldehydes, especially formaldehyde, in the presence of acid catalysts), of diphenols obtained by esterifying 2 mols of the sodium salt of an aromatic hydroxycarboxylic acid with one mol of a dihalogen alkane or dihalogen dialkyl ether (cf. British patent specification No. 1,017,612), of polyphenols obtained by condensing phenols and long-chain halogen paraffins containing at least 2 halogen atoms (cf. British patent specification No. 1,024,288).

Glycidyl ethers of polyhydric alcohols, for example of 1,4-butane diol, 1,4-butane diol, glycerol, trimethylolpropane, pentaerythritol and polyethylene glycols, are also mentioned. Triglycidyl isocyanurate, N,N'-diepoxypropyloxamide, polyglycidyl thio ethers of polyhydric thiols, for example of bismercaptomethylbenzene, diglycidyl trimethylene trisulphone, are also of interest.

It is also possible to use glycidyl esters of polyvalent aromatic, aliphatic and cycloaliphatic carboxylic acids, for example phthalic acid diglycidyl ester, terephthalic acid diglycidyl ester, tetrahydrophthalic acid diglycidyl ester, adipic acid diglycidyl ester, hexahydrophthalic acid diglycidyl ester, which may optionally be substituted by methyl groups, and glycidyl esters of the reaction product of 1 mol of an aromatic or cycloaliphatic dicarboxylic acid anhydride and one-half mol of a diol or 1/n mol of a polyol having n hydroxyl groups, for example glycidyl carboxylic acid esters of the general formula

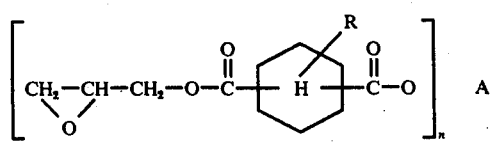

in which A is an at least a divalent radical of an aliphatic hydrocarbon optionally interrupted by oxygen and/or cycloaliphatic rings, or a divalent radical of a cycloaliphatic hydrocarbon, R represents hydrogen or an alkyl radical having from 1 to 3 carbon atoms and $n$ is a number from 2 to 6, or mixtures of glycidyl carboxylic acid esters of the above general formula (cf. British patent specification No. 1,220,702).

The following polyepoxide compounds or mixtures thereof are preferably use for the process according to the invention: polyglycidyl ethers of polyhydric phenols, especially of bisphenol A; polyglycidyl esters of cycloaliphatic dicarboxylic acids, especially hexahydrophthalic acid diglycidyl ester and polypeoxides of the reaction product of $n$ mols of hexahydrophthalic acid anhydride and 1 mol of a polyol with $n$ hydroxyl groups ($n$ is an integer from 2 to 6), especially of 3 mols of hexahydrophthalic acid anhydride and 1 mol of 1,1,1-trimethylolpropane.

Polyglycidyl esters of cycloaliphatic dicarboxylic acids are the most preferred epoxy compounds.

Esterification products of acrylic acid and/or methacrylic acid and polyhydroxy compounds having from 3 to 6 hydroxyl groups, for example glycerol, trimethylolpropane, pentaerythritol, trimethylolhexane, 1,3,6-hexane triol, sorbitol, mannitol, are used as component B. They can be obtained in known manner by azeotropic esterification, transesterification processes of by reacting the aforementioned polyhydroxy compounds with acrylic and/or methacrylic acid halides (for example in accordance with British patent specification No. 423,790 or DT-AS No. 1,267,547).

Preferred compounds of component B are trimethylolpropane triacrylate, pentaerythritol triacrylte and pentaerythritol tetraacylate.

The combination of component A with component B according to the invention can be prepared simply by mixing these two components. However, it can also be of advantage to react the epoxy resin with the unsaturated carboxylic acid in the presence of component B by any one of the known methods. This procedure also allows the reaction of more viscous epoxy resins to form the resin compositions according to the invention. The reaction can be carried out, for example, at a temperature of from 40° to 100° C and optionally in the presence of about 0.01 to 3% by weight, based on epoxide + acid, of a catalyst such as tertiary amines, alkali hydroxides, alkali salts of organic carboxylic acids (cf. U.S. Pat. Nos. 2,456,408, 2,575,440 and 2,698,308).

Suitable photoinitiators are compounds normally used for this purpose, for example benzophenone and, quite generally, aromatic keto compounds derived from benzophenone, such as alkyl benzophenones, halogen methylated benzophenones according to DT-OS No. 1,949,010, Michler's ketone, anthrone or halogenated benzophenones. It is also possible to use benzoin and its derivatives, for example in accordance with German Offenlegungsschriften Nos. 1,769,168; 1,769,853; 1,769,854; 1,807,297; 1,807,301; 1,919,678 and DT-AS No. 1,694,149. Other effective photoinitiators include anthraquinone and many of its derivatives, for example β-methylanthraquinone, tert.-butyl-anthraquinone and anthraquinone carboxylic acid esters as well as oxime esters according to DT-AS No. 1,795,089.

Particularly preferred and benzoin derivatives of the general formula:

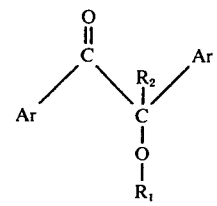

in which:
Ar is an aromatic radical optionally substituted with an alkyl group, an alkoxy group or a halogen atoms;
$R_1$ is a straight-chain or branched alkyl radical with from 1 to 12 carbon atoms a cycloalkyl radical such as cyclohexyl, tetrahydropyranyl or 1-methoxyethyl; and
$R_2$ is allyl, benzyl, optionally substituted with a halogen atom, or the radical —$CH_2$—$CH_2$—X, in which X is CN, $CONH_2$ or $COOR_3$ and $R_3$ is H, or a lower alkyl group with from 1 to 10 carbon atoms.

Ar is preferably phenyl, $R_1$ preferably a straight-chain or branched alkyl radical with from 1 to 4 carbon atoms; and $R_2$ preferably represents an alkyl group or the radical —$CH_2$—$CH_2$—X in which X is CN or $COOR_3$, $R_3$ being an alkyl group with from 1 to 4 carbon atoms.

Suitable compounds of this type are for example the following:

α-allybenzoinmethyl ether, α-allylbenzoin isopropyl ether, α-allylbenzoin ethyl ether, α-allybenzoin butyl ether, α-allylbenzoin propyl ether, α-allylbenzoin octyl ether, α-allylbenzoin dodecyl ether, α-benzylbenzoin methyl ether, α-benzylbenzoin propyl ether, α-benzylbenzoin isopropyl ether, α-benzylbenzoin butyl ether, α-(2-cyanethyl)-benzoin methyl ether; α-(2-cyanethyl)-benzoin ethyl ether, α-(2-cyanethyl)-benzoin propyl ether, α-(2-cyanethyl)-benzoin isopropyl ether, α-(2-cyanethyl)-benzoin butyl ether, α-(2-cyanethyl)-benzoin isobutyl ether, α-(2-cyanethyl)-benzoin hexyl ether, α-(2-cyanethyl)benzoin octyl ether, α-(2-cyanethyl)-benzoin dodecyl ether, α-(2-cyanethyl)-benzoin isooctyl ether, α-(2-carboxyethyl)-benzoin methyl ether, α-(2-carboxyethyl)-benzoin ethyl ether, α-(2-carboxyethyl)-benzoin propyl ether, α-(2-carboxyethyl)-benzoin isoproypl ether, α-(2-carboxyethyl)-benzoin butyl ether, α-(2-carboxyethyl)-benzoin isobutyl ether, α-(2-carboxyethyl)-benzoin hexyl ether, α-(2-carboxyethyl)-benzoin octyl ether, α-(2-carboxyethyl)-benzoin dodecyl ether, α-(2-carboxyethyl)-benzoin isooctyl ether, α-(2-carbomethoxyethyl)-benzoin methyl ether, α-(2-carboxyethyl)-benzoin ethyl, α-(2-carbomethoxyethyl)-benzoin propyl ether, α-(2-carbomethoxyethyl)-benzoin isopropyl ether, α-(2-carbomethoxyethyl)-benzoin butyl ether, α-(2-carbomethoxyethyl)-benzoin isobutyl ether, α-(2-carbomethoxyethyl)-benzoin hexyl ether, α(2-carbomethoxyethyl)-benzoin octyl ether, α-(2-carbomethoxyethyl)-benzoin dodecyl ether, α-(2-carbomethoxyethyl)-benzoin isooctyl ether, α-(2-carboethoxyethyl)-benzoin methyl ether, α-(2-carboethoxyethyl)-benzoin ethyl ether, α-(2-carboethoxyethyl)-benzoin propyl ether, α-(2-carboethoxyethyl)-benzoin isopropyl ether, α-(2-carboethoxyethyl)-benzoin butyl ether, α-(2-carboethoxyethyl)-benzoin isobutyl ether, α-(2-carboethoxyethyl)-benzoin hexyl ether, α(2-carboethoxyethyl)-benzoin octyl ether, α-(2-carboethoxyethyl)-benzoin dodecyl ether, α-(2-carboethoxyethyl)-benzoin isooctyl ether, α-(2-carbopropoxyethyl)-benzoin methyl ether, α-(2carbopropoxyethyl)-benzoin ethyl ether, α-(2-carbopropoxyethyl)-benzoin propyl ether, α-(2-carbopropoxyethyl)-benzoin isopropyl ether, α-(2-carbopropoxyethyl)-benzoin butyl ether, α-(2-carbopropoxyethyl)-benzoin isobutyl ether, α-(2-carbopropoxyethyl)-benzoin hexyl ether, α-(2-carbopropoxyethyl)-benzoin octyl ether, α-(2-carbopropoxyethyl)-benzoin dodecyl ether, α-(2-carbopropoxyethyl)-benzoin isooctyl ether, α-(2-carbo-n-butoxyethyl)-benzoin methyl ether, α(2-carbo-n-butoxyethyl)-benzoin ethyl ether, α-(2-carbo-n-butoxyethyl)-benzoin propyl ether, α-(2-carbo-n-butoxyethyl(-benzoin isopropyl ether, α-(2-carbo-n-butoxyethyl)-benzoin butyl ether, α-(2-carbo-n-butoxyethyl)-benzoin isobutyl ether, α-(2-carbo-n-butoxyethyl)-benzoin hexyl ether, α-(2-carb-n-butoxyethyl)-benzoin octyl ether, α-(2-carbo-n-butoxyethyl)-benzoin dodecyl ether, α-(2-carbo-n-butoxyethyl)-benzoin isooctyl ether, α-(2-carboisooctoxyethyl)-benzoin methyl ether, α-(2-carboisooctoxyethyl)-benzoin ethyl ether, α-(2carboisooctoxyethyl)-benzoin propyl ether, α-(2-carboisooctoxyethyl)-benzoin isopropyl ether, α-(2-carboisooctoxyethyl)-benzoin butyl ether, α-(2-carboisooctoxyethyl)-benzoin isobutyl ether, α-(2-carboisooctoxyethyl)-benzoin hexyl ether, α-(2-carboisooctoxyethyl)-benzoin octyl ether, α-(2-carboisooctoxyethyl)-benzoin dodecyl ether, α-(2-carboisooctoxyethyl)-benzoin isooctyl ether, α-(2-carbonamidoethyl)-benzoin methyl ether, α-(2-cyanethyl)-benzoin tetrahydropyranyl ether, α-(2-cyanethyl)-benzoin-(1-methoxyethylether), α-(2-carbomethoxyethyl)-benzoin tetrahydropyranyl ether, α-(2-carboethoxyethyl)-benzoin-(1-methoxyethylether), α-(2-carbo-n-butoxyethyl)-benzoin tetrahydropyranyl ether, α-(2-carbo-isooctoxyethyl)-benzoin tetrahydropyranyl ether.

By using these special photoinitiators, it is surprisingly possible to produce mixtures based on polyfunctional acrylates which harden in ultraviolet light and, while having the highest possible reactivity under the action of ultraviolet light, show a practically unlimited storage stability in darkness.

It is known to use benzoin derivatives, more especially benzoin ethers, as photoinitiators, and such use is fully described in the literature (e.g., H.-G. Heine, H.-J Rosenkranz, H. Rudolph, Angew, Chemie 84, 1032 –1036, 1972). However, it is also known that numerous experiments have been undertaken in an attempt to improve the unsatifactory storability of systems, consisting of polymerizable resins having vinyl groups, vinyl monomers and benzoin derivatives as photoinitiators, by means of stabilizers (German Auslegeschrift No. 1,902,930) or by the choice of certain benzoin derivatives. More particularly with the system widely used today in the lacquer industry, consisting of unsaturated polyester resin and styrene, a satisfactory solution of the problem of storage stability in darkness could be found by the introduction of secondary benzoin ethers (German Auslegeschrift No. 1,694,149). The benzoin derivatives which are claimed in the present invention are also distinguished by good storage stability in darkness when used in unsaturated polyester resins which harden in ultraviolet light. These findings are set out in U.S. Pat. No. 3,607,693.

It has not so far been possible to find for the present resin system which hardens in ultraviolet light and which consists of acrylic acid-modified epoxy resin and polyfunctional acrylates, any photoinitiator based on benzoin which have produced mixtures having even only limited storability in darkness. Benzoin derivatives which can be introduced into unsaturated polyester resins to form storable mixtures, e.g., benzoin ethers of secondary alcohols, cause total gelling in the present highly reactive resin system within a storage period of a few hours at 60° C or after being stored for 1 day at room temperature.

As regards the polymerizability of this system so it is many times more reactive than for example monofunctional acrylates or unsaturated polyester resins.

Accordingly, it was surprising and could not in any way be forseen that no deterioration in the storage stability in darkness is observed when using the α-allylated benzoin ethers according to the invention as photoinitiators in this resin system. At the same time, the photoinitiators according to the invention have an excellent reactivity which is in no way reduced as compared with known benzoin derivatives.

Highly reactive coating compositions which are stable in storage and used for the same purposes could previously only be produced by using a photoinitiator mixture consisting or benzophenone or benzil and Michlers ketone. Corresponding references can for example be obtained from German Offenlengungsschrift No. 2,345,624. However, such an initiator mixture leads to coatings having a strongly yellow colouring on being hardened under ultraviolet light, so that the range of application of such a mixture is extremely limited.

In contrast the photoinitiator according to the invention, when in thin coating thicknesses (2 to 20 μ) cause practically no discoloration. The compositions hardening in ultraviolet light and produced therewith are thus especially suitable for any coating of paper, light-colored woods and synthetic plastics.

The aforementioned photoinitiators, which are used in a quantity of from 0.2 to 20% by weight, preferably in a quantity of from 1 to 5% by weight, based on the components A+B, depending upon the purpose for which the compositions according to the invention are to be used, can be employed either individually or, as is frequently of advantage owing to synergistic effects, in combination with one another.

In many cases, it can be advantageous to use further additives, either to improve the film-forming properties of the resin compositions or to obtain a particularly scratch-proof surface of the layers. Thus, the resin compositions according to the invention can be mixed with other resins, for example with saturated or unsaturated polyester resins. The resins are preferably used in quantity of from 1 to 50% by weight, based on the components A+B. Basically, however, only those resins should be used for admixture in quantities which are restricted to such an extent that they do not adversely affect reactivity in any way. Suitable lacquer resins of the kind which are commonly used in the lacquer industry are described in E. Karsten's Lackrohstofftabellen, 5th Edition, Curt R. Vincentz Verlag, Hannover, 1972, p. 74 – 106, 195 – 258, 267 – 293, 335 – 347, 357 – 366.

Advantageous additives which can further increase reactivity include certain tertiary amines, such as triethylamine and triethanolamine. A similar effect can be obtained by adding mercapto compounds, such as dodecyl mercaptan, thioglycolic acid esters, thiophenol or mercaptoethanol. The aforementioned additives are preferably used in a quantity of from 0 to 5% by weight, based on components A+B.

Like any system capable of vinyl polymerization, the resin compositions according to the invention necessitate the addition of polymerization inhibitors in order to obtain high storage stability. Suitable compounds known to experts include phenols, for example hydroquinone, toluhydroquinone, di-tert-butyl-p-cresol, hydroquinone monomethylether, and also phenothiazine or copper compounds. The quantity to be added depends on the required stabilizing effect and also on the acceptable loss of reactivity frequently caused by the addition of stabilizers. In this case, information on both the type and the optimum quantity of stabilizer must be obtained from concentration tests to be carried out from case to case with fluctuating stabilizer concentrations. The additions generally amount to between 0.001 and 0.5% by weight, based on components A+B.

Artificial light sources with an emission in the range from 2500 to 5000 A, preferably from 3000 to 4000 A, can be used as the radiation source for carrying out the photopolymerization reaction. It is of advantage to use mercury vapor, xenon or tungsten lamps, especially high-pressure mercury lamps. In general, layers with a thickness of from 1 to 500 $\mu$m (1 $\mu$m = $10^{-3}$ mm) cure in less than 1 second to form a film when irradiated with the light of a high-pressure mercury lamp, for example of the HTQ-7 type manufactured by Philips, arranged at a distance of 10 cm.

This property makes the products particularly suitable for use as binders in printing inks which harden under UV-light, because it is important in this particular application for a tack-free, dry surface to be very quickly obtained. The usual additives, such as paraffin oils, polyethylene waxes, silica, talcum, chalk, light and heavy spar, and the pigments normally used in printing inks can be readily employed. Typical pigments are, for example, organic pigments of the azo series (cf. Ullmann's Enczyclopadie der techn. Chemie, Vol. 13, page 809); phthalocyanine pigments; anthraquinone dyes (cf. Ullmann's Enczylopadie der techn. Chemie, Vol. 13, 1952, page 693) and quinacridone pigments, inorganic pigments such as titanium dioxide, iron oxide, cadmium, chromium and zinc pigments, also carbon black.

The resin compositions according to the invention which harden under UV-light can also be used for coating and impregnating wood, paper and various grades of cardboard, leather, plastics, textiles, and also for coating ceramic materials and metals. They can be applied by the methods normally used in the lacquer industry, such as casting, spray-coating, roll-coating or knife-coating. It may be desirable in applications such as these to add solvents, for example ester, ketone or aromatic solvents, in order to adapt the viscosity. Vinyl monomers such as acrylic or methacrylic acid esters or styrene can also be added.

In order to illustrate the invention, a few typical embodiments are described in the following Examples.

EXAMPLE 1

340 parts by weight of bisphenol A-bis-glycidyl ether (epoxide equivalent 190) were mixed with 115 parts by weight of acrylic acid, 5 parts by weight of sodium stearate and 0.05 parts by weight of hydroquinone monomethylether, and the resulting mixture was heated for 15 hours with stirring to a temperature of 60° C. Thereafter, the mixture had an acid number (AN) of 7. 235 Parts by weight of trimethylolpropane tricrylate, 35 parts by weight of p-benzoylbenzal chloride and 14 parts by weight of triethanolamine were added and the entire mixture was thoroughly homogenized, giving a resin mixture with a viscosity of 320 poises (20° C), as measured in an Agfa rotary viscometer.

Using a hand coater, the mixture was applied to paper in a layer thickness of about 100 $\mu$, and subsequently guided past a Philips type HTQ-7 high-pressure mercury lamp at a distance of 10 cm. A tack-free, solid coating was obtained after an exposure time of 0.7 second.

EXAMPLE 2

300 Parts by weight of hexahydrophthalic acid diglycidyl ester (epoxide equivalent 175), 120 parts by weight of acrylic acid, 5 parts by weight of sodium stearate, 0.1 part by weight of hydroquinone monomethylether and 200 parts by weight of trimethylolpropane triacrylate were mixed and heated with stirring for 20 hours at a temperature of 60° C. Thereafter, the AN had fallen to 3.

2 Parts by weight of mercapto ethanol and the following photoinitiators (in the quantities indicated) were then added to batches of 100 parts by weight of the mixture.

|  | Hardening time of an approximately 100 $\mu$ thick layer under a high-pressure mercury lamp (Philips HTQ-7) at a distance of 10 cm |
| --- | --- |
|  | Seconds |
| 3 parts by weight of p-benzoyl-benzal chloride | 0.4 |
| 3 parts by weight of benzophenone | 0.8 |
| 3 parts by weight of benzophenone + 1.5 parts by weight of Michler's ketone | 0.3 |
| 3 parts by weight of tert.-butyl-anthraquinone | 0.4 |
| 3 parts by weight of benzoin-isopropyl ether | 0.6 |

EXAMPLE 3

340 Parts by weight of bisphenol A-bis-glycidylether (epoxide equivalent 190), 200 parts by weight of pentaerythritol triacrylate, 115 parts by weight of acrylic acid, 5 parts by weight of sodium stearate and 0.05 parts by weight of hydroquinone monomethyl ether were mixed and the resulting mixture heated with stirring for 15 hours at 60° C. The mixture then had an AN of 13. 100 parts by weight of the resin were mixed with 5 parts by weight of triethanolamine and 3 parts by weight of benzophenone, and the resulting mixture was applied to printed cardboard in a layer thickness of about 20 $\mu$. After exposure for 0.5 seconds to the light of a high-pressure mercury lamp (Philips HTQ-7) at a distance of 10 cm, a tack-free, high-gloss coating completely solvent resistant was obtained.

EXAMPLE 4

100 parts by weight of the resin mixture of Example 2 were mixed with 2 parts by weight of triethanolamine, 3 parts by weight of benzophenone and 0.5 parts by weight of Michler's ketone. This composition hardening under UV-light did not show any signs of gelation in the absence of light when the storage temperature was increased to 60° C, even after a period of 10 days. Exposure of a 100 μ thick layer in accordance with Example 2 produced a tack-free coating after 0.2 seconds.

EXAMPLE 5

3.2 parts by weight of the mixture of Example 4 were ground on a three-roll stand with 0.8 parts by weight of a blue pigment (Colour Index, Pigment blue 15) and 0.5 parts by weight of aerosil, giving a printing ink which was readily applied in a high-pressure press (Heidelberger high-speed press). When the inks thus applied were guided past a high-pressure mercury lamp (Philips HTQ-7) at a distance of 4 cm, an exposure time of 0.1 second was sufficient to obtain tack-free drying. The prints did not rub off and showed a high gloss level.

EXAMPLE 6

304 parts by weight of bisphenol A-bis-glycidyl ether (epoxide equivalent 190), 200 parts by weight of pentaerythritol tetraacrylate, 115 parts by weight of acrylic acid, 5 parts by weight of sodium stearate and 0.5 parts by weight of hydroquinone monomethylether were mixed and the resulting mixture heated while stirring for 15 hours at 60° C. Thereafter, the mixture had an AN of 13. 100 parts by weight of the resin were mixed with 5 parts by weight of triethanolamine and 3 parts by weight of benzophenone, and the resulting mixture was applied to a beechwood panel in a layer thickness of about 30 μ. After exposure for about 0.3 seconds to the light of a high-pressure mercury lamp (Philips HTQ-7) at a distance of 10 cm, a high-gloss tack-free coating completely resistant to solvents was obtained.

EXAMPLE 7

340 parts by weight of bis-phenyl A-bis-glycidyl ether (epoxide equivalent 190) were mixed with 115 parts by weight of acrylic acid, 5 parts by weight of sodium stearate and 0.05 part by weight of hydroquinone monomethyl ether and heated for 15 hours to 60° C while stirring. After this time, the mixture had an acid number of 7. 235 parts by weight of trimethylolpropane triacrylate were added and the complete mixture was well homogenised. A resin mixture was obtained having a viscosity of 390 poises (20° C), measured in the Agfa rotation viscometer.

The photoinitiators listed in Table 1 and accelerators were added to and dissolved in this mixture with gentle heating. Using a hand coater, layers having a thickness of 100 μ were applied to white paper and these layers were then irradiated with light from a mercury high-pressure lamp of the type HTQ-7(Philips) spaced 10 cm therefrom. The times listed in Table 1 indicate the time of exposure required for the non-tacky curing of the film.

Table 1

| Inititator | Added quantity in % by weight | Exposure time in seconds |
|---|---|---|
| α-Benzylbenzoin methyl ether | 5 | 2 |
| α-(β-Cyanoethyl)-benzoincyclohexyl ether | 5 | 2 |
| α-(β-Cyanoethyl)-benzoinethylether | 5 | 1.5 |
| α-(β-Cyanoethyl)-benzoinisopropyl ether | 5 | 2 |
| α-Allylbenzoinisopropyl ether | 5 | 0.6 |
| α-(β-Carbethoxyethyl)-benzoin ethyl ether | 5 | 0.5 |
| α-Benzylbenzoin methyl ether + triethanolamine | 5 2 | 0.3 |
| α-(β-Cyanoethyl)-benzoin ethyl ether + triethanolamine | 5 2 | 0.1 |

All the mixtures forming the basic of Table 1 are subjected to difficult storage at a temperature raised to 60° C. The specimens showed no change, even after being stored for 4 weeks.

EXAMLE 8

300 parts by weight of hexahydrophthalic acid diglycidyl ester (epoxide equivalent 175), 120 parts by weight of acrylic acid, 5 parts by weight of sodium stearate, 0.1 part by weight of hydroquinone monmethyl ether and 200 parts by weight or trimethylolpropane triacrylate were mixed and heated to 60° C for 20 hours while stirring. After this time, the acid number had fallen to 3. To some specimens of this resin were added 3% by weight of the photoinitiators listed in Table 2, tested as in Example 1 for their curing time and subjected to storage in darkness at 60° C.

Table 2

| | Exposure time in seconds | Storage time in darkness |
|---|---|---|
| α-Benzoylbenzoin methyl ether | 4 | 4 weeks |
| α-(β-Carboxyethyl)-benzoin ethyl ether | 5 | 22 days |
| α-(β-Carbomethoxyethyl)-benzoin isopropyl ether | 2 | 4 weeks |
| α-(β-Cyanoethyl)-benzoin isopropyl ether | 3 | 4 weeks |
| α-(β-Cyanoethyl)-benzoin cyclohexyl ether | 3 | 4 weeks |

EXAMPLE 9

100 parts by weight of the resin mixture of Example 8 were mixed with 35 parts by weight of α-(β-carbomethoxy)-ethylbenzoin isopropyl ether and 3 parts by weight of triethanolamine. This composition, hardening under ultraviolet light, showed no indication of gelling, even after 4 weeks, with a storage temperature raised to 60° C and with exclusion of light. On being exposed to light a coating with a thickness of 100 μ similarly prepared to Example 2, formed a colorless, non-tacky coating after 0.2 second.

When a mixture of 3 parts by weight of benzophenone and 0.5 part by weight of Michlers ketone were used instead of the 3.5 parts by weight of the photoinitiator according to the invention the result was a coating with a strong yellow coloring, with practically the same drying speed.

EXAMPLE 10

3.2 parts by weight of the mixture of Example 9 together with α-(β-carbomethoxy)-ethylbenzoin isopropyl ether were ground on a three-roll stand with 0.8 part by weight of blue pigment dyestuff (Colour Index, pigment blue 15) and 0.05 part by weight of Aerosil. A printing ink was obtained with which printing could take place without any problems on an intaglio printing press (Heidelberg high-speec press). If the prints were guided beneath a mercury high-pressure lamp (HTQ 7, Philips) at a distance of 4 cm, an exposure time of 0.1 second was sufficient to produce a non-tacky drying. The prints showed high abrasion resistance and a good gloss.

We claim:

1. A mixture hardenable by UV light comprising
   A. 30–95% by weight of the reaction product of at least one epoxide having more than one epoxide group per molecule and acrylic acid, said reaction product containing about 0.6 to 1 mol of carboxyl groups per epoxide group;
   B. 5–70% by weight of at least one tris-, tetra-, penta- or hexaacrylic or tris-, tetra-, penta- or hexamethacrylic acid ester of at least one trihydric, tetrahydric, pentahydric or hexahydric alcohol and
   C. 0.2–10% by weight, based on the weight of (A) and (B), of a photoinitiator of the formula

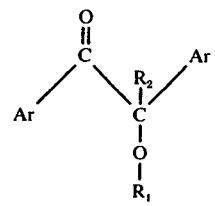

wherein Ar is phenyl or said phenyl mono-substituted by alkyl, alkoxy or halogen; $R_1$ is alkyl having from 1 to 12 carbon atoms, cyclohexyl, tetrahydropyranyl or 1-methoxyethyl and $R_2$ is allyl, benzyl, halobenzyl or —$CH_2$—$CH_2$—X wherein X is CN, $CONH_2$, or $COOR_3$ wherein $R_3$ is hydrogen or alkyl having 1 to 10 carbon atoms.

2. The mixture of claim 1 wherein (A) contains 0.8 to 1 mol of carboxyl groups per epoxide group.

3. The mixture of claim 1 wherein (C) is α-(β-cyanoethyol)-benzoin ethyl ether.

* * * * *